(12) United States Patent  (10) Patent No.: US 7,621,684 B2
Ellison Biddle et al.  (45) Date of Patent: Nov. 24, 2009

(54) INTEGRATED HOME ENTERTAINMENT UNIT

(75) Inventors: Mary E. Ellison Biddle, Lexington, KY (US); James L. Combs, Lexington, KY (US); Monty L. Fransis, Lexington, KY (US); Jack L. Gentry, Jr., Lexington, KY (US); William C. McCornack, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 695 days.

(21) Appl. No.: 10/957,090

(22) Filed: Sep. 30, 2004

(65) Prior Publication Data

US 2006/0072146 A1  Apr. 6, 2006

(51) Int. Cl.
*B41J 29/00* (2006.01)
(52) U.S. Cl. ........................ 400/693; 400/624
(58) Field of Classification Search ............... 400/624, 400/691, 693; 358/1.9, 1.15
See application file for complete search history.

(56) References Cited

U.S. PATENT DOCUMENTS

| | | | |
|---|---|---|---|
| 4,641,980 A | | 2/1987 | Matsumoto et al. |
| D334,022 S | | 3/1993 | Byun |
| 5,499,113 A | * | 3/1996 | Tsuboi et al. ............... 358/479 |
| 6,079,707 A | * | 6/2000 | Fujiwara et al. ............. 271/207 |
| D461,788 S | | 8/2002 | Oka |
| 6,428,228 B1 | | 8/2002 | McKay et al. |
| 6,447,113 B1 | | 9/2002 | Silverbrook et al. |
| 6,449,052 B1 | | 9/2002 | Sherer et al. |
| 6,540,320 B2 | | 4/2003 | Ng |
| 6,644,802 B2 | * | 11/2003 | Minowa .................... 347/105 |
| 6,652,089 B2 | | 11/2003 | Silverbrook |
| 6,652,090 B2 | | 11/2003 | Silverbrook |
| 6,652,174 B1 | | 11/2003 | Mann et al. |
| 6,835,135 B1 | * | 12/2004 | Silverbrook et al. ......... 463/30 |
| 6,944,689 B2 | * | 9/2005 | Billington et al. ............ 710/62 |
| 7,125,184 B2 | * | 10/2006 | Cheng et al. ................ 400/693 |
| 2003/0043353 A1 | * | 3/2003 | Oka et al. .................... 355/40 |
| 2003/0223736 A1 | * | 12/2003 | Muzaffer et al. ........... 386/125 |
| 2005/0068581 A1 | * | 3/2005 | Hull et al. .................. 358/1.16 |

OTHER PUBLICATIONS

Epson, "Livingstation LS47P1," catalog, Epson America, Inc.

* cited by examiner

*Primary Examiner*—Daniel J Colilla
(74) *Attorney, Agent, or Firm*—Taylor & Aust PC

(57) ABSTRACT

An integrated home entertainment unit includes a print media source, a print engine coupled to the print media source configured to hold a print medium, an optical disk drive configured to output formatted digital data, and a controller. The controller has a processor and a decoder, and controller being communicatively coupled to the optical disk drive and to the print engine. The decoder is configured to decode the formatted digital data to produce output data. The processor executes instructions to control the print engine to print an image on the print medium supplied from the print media source using at least a part of the output data. A housing has mounted therein the print media source, the print engine, the optical disk drive, and the controller.

5 Claims, 6 Drawing Sheets

INTEGRATED HOME ENTERTAINMENT UNIT

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND OF THE INVENTION

1. Field of the Invention

The present invention relates to home entertainment systems, and, more particularly, to an integrated home entertainment unit having an optical disk drive and a print engine.

2. Description of the Related Art

The availability of consumer electronic devices for home and family entertainment has increased markedly in recent years. For example, the wide acceptance of digital versatile disk (DVD) players in the consumer market has resulted in a proliferation of these devices, which are used as part of the consumers' home entertainment systems. The operative component of a DVD player is an optical disk drive that allows the information encoded onto a DVD disk to be viewed. DVD player/recorders also allow information to be recorded onto a DVD disk.

Another consumer item gaining in popularity is the digital camera. However, digital camera sales appear to be limited by customer acceptance. One obstacle cited by consumers is the difficulty in viewing, sharing, and printing the photos generated by a digital camera in a user-friendly environment. For example, in order to view, share, and print the photos, a personal computer with a printer is typically required. Photos are often "developed" for the consumer onto a compact disk (CD), which may be viewed using an optical disc drive, such as a computer's CD or DVD drive. The computer's monitor can be used to view and edit the photos, e.g., to crop the photo or to remove red-eye. By using the personal computer's CD and/or DVD drive, photos can be stored permanently, and consumers can share their photos, for example, by exchanging disks or printed hardcopies. However, a personal computer can be expensive to procure and cumbersome to operate. In addition, a dedicated printer used for printing photos can also be expensive. Further, a conventional personal computer with monitor and printer typically does not fit within the decor of the typical consumer living room home entertainment system.

What is needed in the art is an integrated home entertainment unit that allows viewing, sharing, and printing of photos.

SUMMARY OF THE INVENTION

The present invention provides an integrated home entertainment unit that allows viewing, sharing, and printing of photos.

The invention, in one form thereof, relates to an integrated home entertainment unit. The integrated home entertainment unit includes a print media source configured to hold a print medium, a print engine coupled to the print media source, an optical disk drive configured to output formatted digital data, and a controller. The controller has a processor and a decoder, the controller being communicatively coupled to the optical disk drive and to the print engine. The decoder is configured to decode the formatted digital data to produce output data. The processor executes instructions to control the print engine to print an image on the print medium supplied from the print media source using at least a part of the output data. A housing has mounted therein the print media source, the print engine, the optical disk drive, and the controller.

The invention, in another form thereof, relates to method of operating an integrated home entertainment unit. The method includes providing an integrated home entertainment unit having an optical disk drive and a print engine; playing an optical disk on the optical disk drive; displaying an image sought to be printed; and executing a first single command to both pause the optical disk drive and to print the image with the print engine.

The invention, in yet another form thereof, relates to an integrated home entertainment unit. The integrated home entertainment unit includes a print media source configured to hold a print medium, a print engine coupled to the print media source, an optical disk drive configured to output formatted digital data, and a controller having a processor and a decoder. The controller is communicatively coupled to the optical disk drive and to the print engine. The decoder is configured to decode the formatted digital data to produce output data. The processor executes instructions to control the print engine to print an image on the print medium supplied from the print media source using at least a part of the output data. The controller is configured to both pause an operation of the optical disk drive and to cause the print engine to print the image in response to a first single command issued by a user of the integrated home entertainment unit.

With the present invention duplicity of home entertainment components is reduced, thus reducing the cost of the integrated home entertainment unit to the customer. Further by reducing the duplicity of home entertainment components, the physical space requirements of the integrated home entertainment unit is reduced.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
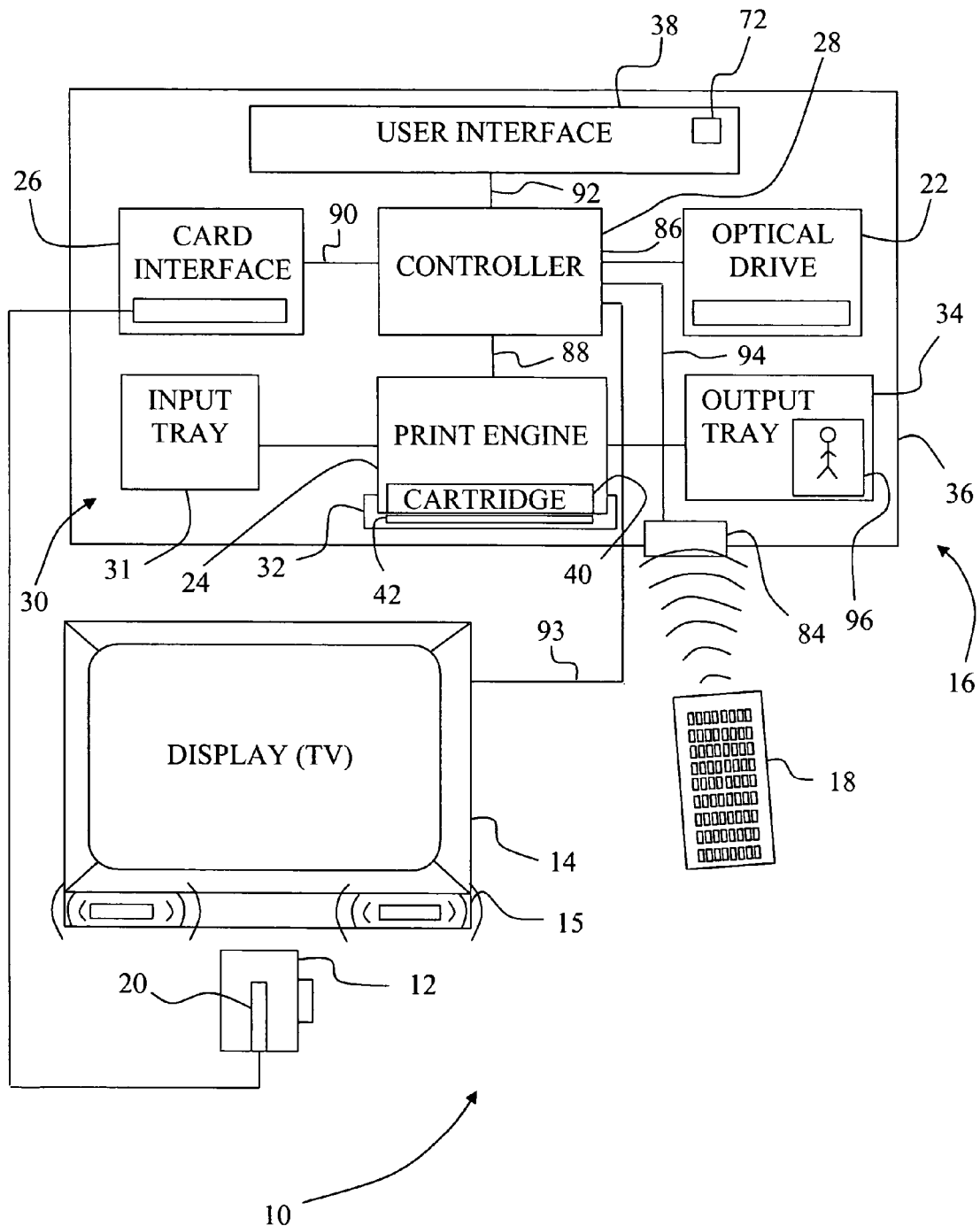
FIG. 1 is a diagrammatic depiction of a home entertainment system featuring an integrated home entertainment unit in accordance with the present invention.

Referring now to the drawings and particularly to FIG. 1, there is shown a home entertainment system 10 embodying the present invention. Home entertainment system 10 includes one or more of a digital device 12, for example, a digital camera 12, a display monitor 14 including an audio system 15, an integrated home entertainment unit 16, and a remote control 18 for operating integrated home entertainment unit 16. Home entertainment system 10 provides the user with the ability to view, share, and print photos generated by digital device 12 in a user-friendly environment.

In the present embodiment, digital device 12 takes the form of digital camera 12. Alternatively, however, it is contemplated that digital device 12 may be one or more of many types of digital devices, and may be a conventional digital camera for taking still photos or video sequences, for example, using a charge-coupled device (CCD), and stores the photos and/or video sequences in a memory device such as a memory card 20. Alternatively, digital device 12 may be a video camera, for example, of the type used to record home movies, or any digital camera or digital video recording device, including those used as accessories with, or integral to, for example, a cellular phone, a personal digital assistant, or a laptop or stationary computer. Alternatively still, another type of digital device 12 may be any device capable of storing, generating, or capturing image data, including still and/or video image data, for example, an external CD or DVD drive, a web page, a television set, or a computer.

Display monitor 14 is a video monitor, for example, in the form of a television set or a home entertainment video monitor. In the embodiment shown, display monitor 14 is an external stand-alone display monitor. Alternatively, however, it is contemplated that some embodiments of the present invention may incorporate display monitor 14 in the form of a built-in display monitor. Although in the present embodiment, audio system 15 is integrated with display monitor 14, it is alternatively contemplated that audio system 15 may be part of integrated home entertainment system 16, or may be a separate audio system, for example, part of a home stereo system.

Integrated home entertainment unit 16, described in greater detail below, is configured to play DVDs for viewing on display monitor 14, for example, movies, and to display, print, store, and/or manipulate images, for example, photos or video captured by digital camera 12, and images stored on DVD or CD disks. Preferably, integrated home entertainment unit 16 is fashioned with an appearance appropriate for the typical consumer living room home entertainment center, and is physically sized similar to typical home entertainment units, such as CD players, DVD players, tuners, amplifiers, equalizers, etc.

Remote control 18 is an infrared remote control, for example, of the type used in conventional home entertainment systems. Alternatively, it is contemplated that remote control 18 may operate by any convenient method of transmitting information, such as by using a radio frequency transmitter. As with conventional such remote controls, remote control 18 has a plurality buttons used for controlling integrated home entertainment unit 16, and for turning integrated home entertainment unit 16 on and off.

Integrated home entertainment unit 16 includes an optical disk drive 22, a print engine 24, a memory card interface 26, a controller 28, a print media source 30 in the form of a print media input tray 31, a print engine drawer 32, a print media output tray 34, housing 36, and a user interface 38.

Optical disk drive 22 is a conventional optical disk drive, and is configured to read from and write to optical disks, such as DVD and CD disks, including audio and video data, e.g. image data. Optical disk drive 22 is configured to output formatted digital data for viewing by display monitor 14 and for printing via print engine 24. As depicted, optical disk drive 22 is in the form of a DVD/CD player/recorder.

Print engine 24 includes an imaging cartridge 40, and is coupled to print media source 30. In the present embodiment, print engine 24 in the form of an ink jet print engine, is configured for forming an image on a 4" by 6" print medium 42, such as photo-quality paper. Print engine 24 operates to scan imaging cartridge 40 across the 4" dimension of print medium 42, i.e., the short axis of print medium 42, in a direction orthogonal to the front of housing 36, and eject ink droplets onto print medium 42 in order to reproduce text or images, etc. Print medium 42 is fed through print engine 24 in the direction of the long axis of print medium 42, i.e., the 6" dimension. Alternatively, however, it is contemplated that print engine 24 may be an electrophotographic print engine. As an electrophotographic print engine, print engine 24 causes imaging cartridge 40 to deposit toner onto print medium 42, which is then fused to print medium 42 by a fuser (not shown). Print engine 24 is an edge-to-edge printer, and produces 4" by 6" photo-quality prints using print medium 42.

Memory card interface 26 is a media card interface, such as a 7-to-1 media card interface, and is configured to perform reading and writing operations on a memory card 20 that can be in a variety of formats and sizes. Memory card interface supports many available memory card types used in digital devices, such as digital cameras and MP3 players, for example, Compact Flash® memory, SmartMedia® cards, Sony Memory Stick® cards, MultiMediaCard®, and Secure Digital® cards, and hence, can perform read/write operations on a plurality of types of memory card 20. Memory card interface 26 provides integrated home entertainment unit 16 with an enhanced ability to allow users to transfer photo or audio data between integrated home entertainment unit 16 and memory card 20, for example, to store photos on a CD using optical disk drive 22, or to copy photos from one memory card 20 to another memory card 20 of the same or different type.

Figure 2:
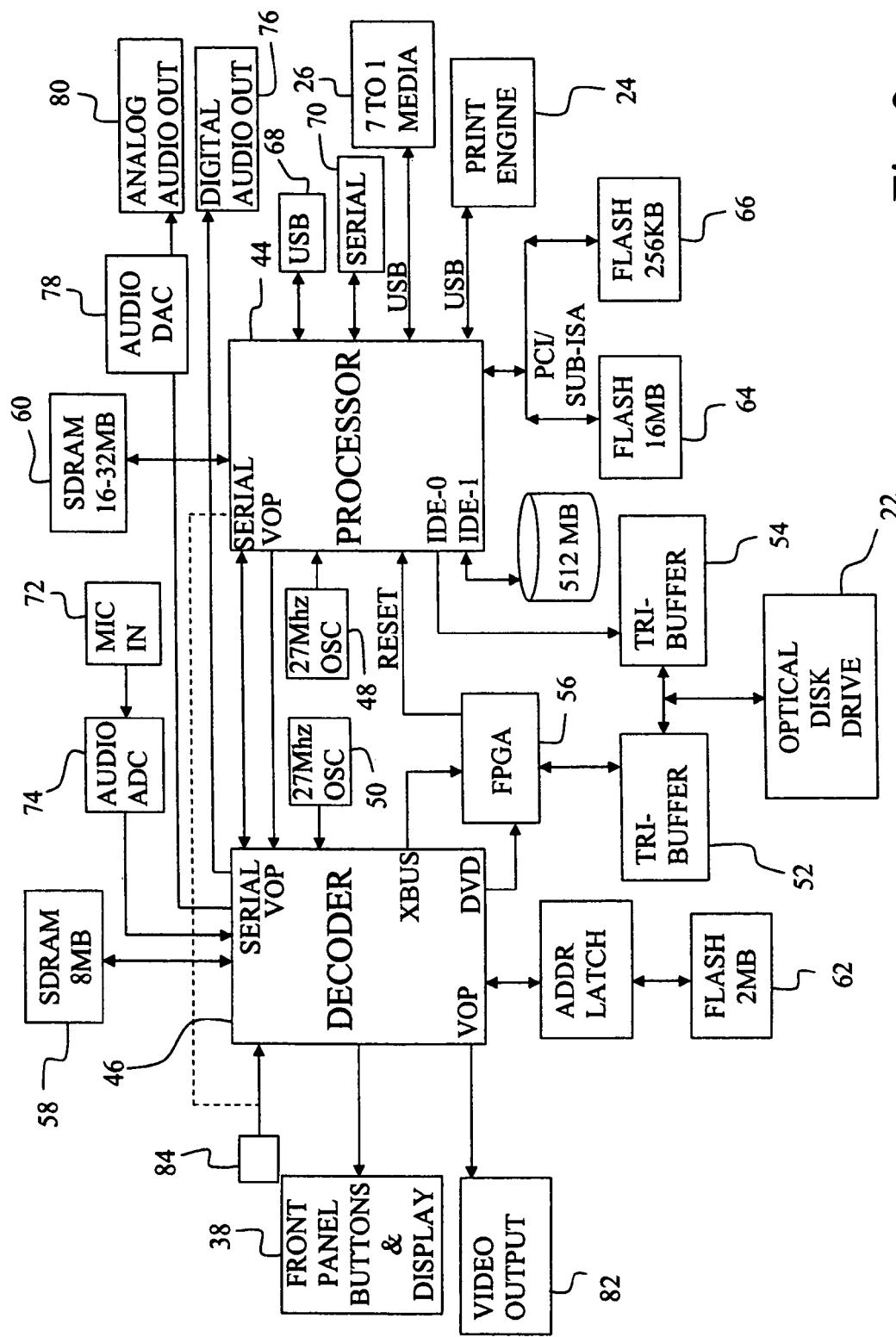
FIG. 2 is a schematic depiction of a controller employed by the integrated home entertainment unit embodied in FIG. 1.

Referring now to FIG. 2, controller 28 includes a processor 44 and a decoder 46. Operations timing is provided to processor 44 and decoder 46 by an oscillator 48 and an oscillator 50, respectively. A tri-state buffer 52 and a tri-state buffer 54 are communicatively coupled to processor 44 and decoder 46, respectively. Tri-state buffer 52 and tri-state buffer 54 are also communicatively coupled to optical disk drive 22 and to each other, and are configured to transmit electronic data between each of optical disk drive 22, processor 44, and decoder 46 during the operations of integrated home entertainment unit 16. For example, any one of optical disk drive 22, processor 44, and decoder 46 may provide or receive input data to or from the other two. Field programmable gate array (FPGA) 56 is communicatively coupled to each of processor 44, decoder 46, and tri-state buffer 52, and is configured to act as a switch for switching between processor 44 and decoder 46.

Controller 28 also includes memory 58, such as SDRAM, associated with processor 44, and memory 60 associated with decoder 46, and may also access other memories, such as flash memory 62, 64, 66. A universal serial bus (USB) port 68 and a serial port 70 each provide for external device communication with processor 44. For example, digital camera 12 may be directly connected to controller 28 via USB port 68. A microphone input port 72 and an analog-to-digital converter (ADC) 74 associated with decoder 46 are provided for receiving voice or other audio data. A digital audio output port 76, for example, in the form of a Sony/Phillips Digital Interface (S/PDIF), provides digital audio output from controller 28, for example, to audio system 15. An analog audio output port 80 in conjunction with a digital-to-analog (DAC) 78 provides analog audio output from controller 28, for example, to audio system 15. A video output port 82 is connected to display monitor 14, and outputs video data to display monitor 14, for example, composite video data, component video data, or S-video data.

Integrated home entertainment unit 16 can also be configured to include a network adapter (not shown) allowing integrated home entertainment unit 16 to be connected, wired or wireless, to a network. This would permit sharing of the stored card data with other users of the network. In addition, although several memory devices, such as memories 58 and 60 or flash memory 62, 64, and 66 are illustrated in integrated home entertainment unit 16 it should be understood that they can be portions of a single memory device, or a combination of two or more devices. Similarly, oscillators 48 and 58 can be configured as a single device and tri-state buffers 52 and 54 can be portions of a single buffer device, or a combination of two or more devices.

Remote control 18 is communicatively coupled to decoder 46, and is configured to transmit commands from the user to controller 28. Accordingly, controller 28 includes a control interface 84 for receiving control inputs from remote control 18.

Referring again to FIG. 1, controller 28 is communicatively coupled to optical disk drive 22 via a communications link 86, such as a ribbon, or any standard electrical cabling or bus structures, or by wireless connection. Controller 28 is communicatively coupled to print engine 24 via a communications link 88, is communicatively coupled to memory card interface 26 via a communications link 90, is communicatively coupled to user interface 38 via a communications link 92, and is communicatively coupled to display monitor 14 via a communications link 93. Each of communications link 88, communications link 90, and communications link 92 can be any convenient digital communications medium, for example, a USB cable. In order to receive control inputs from remote control 18, a control interface 84, such as an infrared (IR) sensor, is installed on housing 36 of integrated home entertainment unit 16, and communicatively coupled to controller 28 via a communications link 94.

During operation of integrated home entertainment unit 16, processor 44 provides computer functionality to the operations of controller 28, and uses a conventional operating system, such as Linux. The operating system provides for hardware attachment, photo manipulation software, printer driver software that includes routines to convert video data or digital memory card data to cyan, magenta, yellow black color space data used for printing and for controlling image scan unit 40, remote control interface screens and data storage. Processor 44 functions include controlling print engine 24 to print images, controlling optical disk drive 22 to read from or write to optical disks, and generating user screens on display monitor 14 in response to user inputs via remote control 18 and/or user interface 38. For example, in order to perform printing, controller 28 provides formatted print data to print engine 24. The user interface screens are generated by processor 44, and superimposed onto decoder 46 video output at video output port 82. This allows the user to initiate actions, while, for example, a DVD movie is being played on optical disk drive 22, for example, printing a photo. In addition, processor 44 drives memory card interface 26 using driver software, such as a Linux program.

Decoder 46 is configured to decode the formatted digital data provided by optical disk drive 22 and memory card interface 26 to produce output data. Decoder 46 provides decoding of standard file formats, such as DVD video, JPEG pictures, MP3 audio, and CD audio for use in providing the video and audio output of integrated home entertainment unit 16. In addition, decoder 46 receives control signals from remote control 18 via control interface 84, and processes the commands received by the user. Alternatively, it is contemplated that decoder 46 passes the received commands to processor 44 for processing.

Controller 28 is configured to perform read/write operations on memory card 20 using memory card interface 26, including performing read/write operations on the plurality of types of memory card 20 supported by memory card interface 26. Decoder 46 is configured to decode card data stored in memory card 20 to form decoded card data. Memory card interface 26 and controller 28 are configured to transfer card data between optical disk drive 22 and any memory card 20. For example, image data and audio data can be transferred from any memory card 20 in memory card interface 26 to any DVD or CD disk in optical disk drive 20, and image data and audio data can be transferred from any DVD or CD disk in optical disk drive 20 to any memory card 20 inserted into memory card interface 26.

In addition, controller 28 is configured to exhibit the decoded card data on display monitor 14, for example, in the form of a photo image. The output data produced by decoder 46 includes decoded card data, which can be printed by print engine 24, viewed on display monitor 14, copied to a disk using optical disk drive 22, or manipulated using software executing on processor 44. Also, controller 28 is configured to present a slide show using display monitor 14 and audio system 15.

As depicted in FIG. 1, mounted in housing 36 are print media source 30, print engine 24, optical disk drive 22, and controller 28. Processor 44 executes instructions to control print engine 24 to print an image 96 on print medium 42 supplied from print media source 30 using at least a part of the output data decoded by decoder 46. Using tri-state buffer 52, tri-state buffer 54, and FPGA 56, controller 28 is configured to perform a "pause-print" operation. With the "pause-print" capability of the present invention, controller 28 executes instructions to both pause the operation of optical disk drive 22 and to print image 96 in response to a single command issued by a user of integrated home entertainment unit 16, for example, via remote control 18. Thus, for example, the user might be watching a DVD video using optical disk drive 22, and might wish to "pause-print" a frame from the video. In order to do so, for example, the user would simply press a "pause-print" button on remote control 18 or user interface 38, which directs controller 28 to pause the operation of optical disk drive 22, and to cause print engine 24 to print image 96.

Similarly, while watching the video the user may desire to print image 96 in the form of a photo generated by digital camera 12 and stored in memory card 20. In such a case the user would insert memory card 20 into memory card interface 26, and press a button on remote control 18 or on user interface 38, directing controller 28 to pause the operation of optical disk drive 22, and generate a user selection screen using processor 44. Controller 28 overlays the user selection screen on the paused video output of decoder 46 for display on display monitor 14. The user selection screen allows the user to select and then print image 96 from memory card 20, wherein image 96 is printed based on the decoded card data.

The "pause-print" feature works with image data stored in other digital devices 12 in the same manner. For example, USB port 68 and controller 28 are configured to perform read/write operations on various types of digital device 12, and to transfer image data between optical disk drive 22 and digital devices 12. Decoder 46 is configured to decode the image data to form decoded image data as output data, and an image can be printed based on the decoded image data. Controller 28 is also configured to display the image on display monitor 14 via video output port 82 based at least in part on the output data. As with the "pause-print" operation of a DVD video frame or a photo stored in memory card 20, as discussed above, controller 28 is configured to both pause an operation of optical disk drive 22 and to allow user selection and printing of the image stored in digital device 12 in response to a single command issued by the user of integrated home entertainment unit 16.

In either case, when the user presses the appropriate button, optical disk drive 22 is automatically paused, and FPGA 56 switches control of integrated home entertainment unit 16 over from decoder 46 to processor 44 for the image selection and printing process. Controller 28 is also configured to both resume the operation of optical disk drive 22 and to cause print engine 24 to continue to print image 96 in response to another single command issued by the user, for example, by pressing a "play" button on remote control 18.

Figure 3:
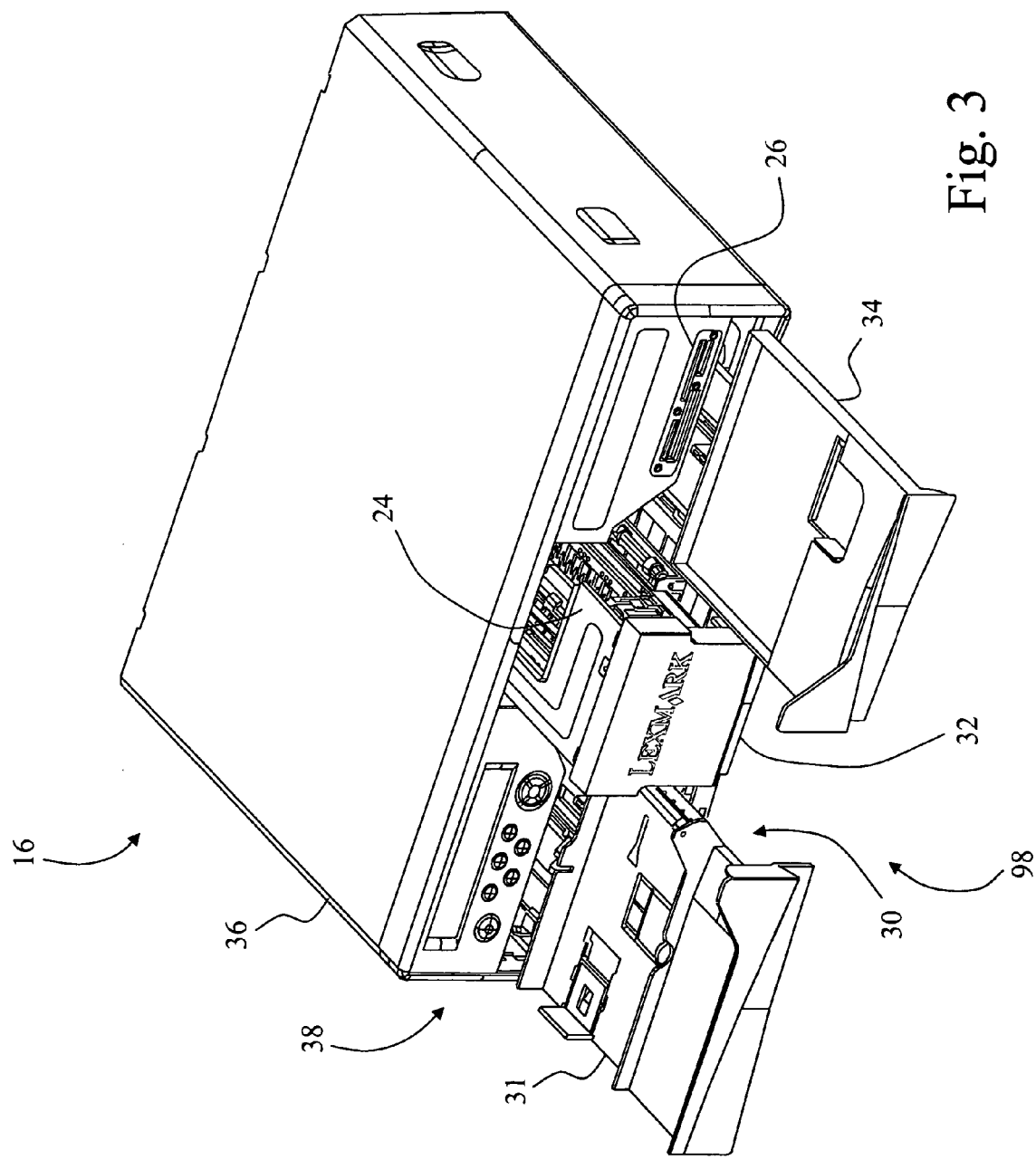
FIG. 3 is an external perspective view of the integrated home entertainment unit of FIG. 1, depicting print media input and output trays and a print engine drawer in extended positions.

Referring now to FIG. 3, housing 36 includes an opening 98 that allows access to print engine 24. Opening 98 is configured to receive print media input tray 31. Print media input tray 31 is mounted in housing 36, and is configured to extend and retract through opening 98. For example, the user may extend print media input tray 31 to the position shown in FIG. 3 to fill print media input tray 31 with print media, for example, print medium 42 in the form of photo-quality paper.

Figure 4:
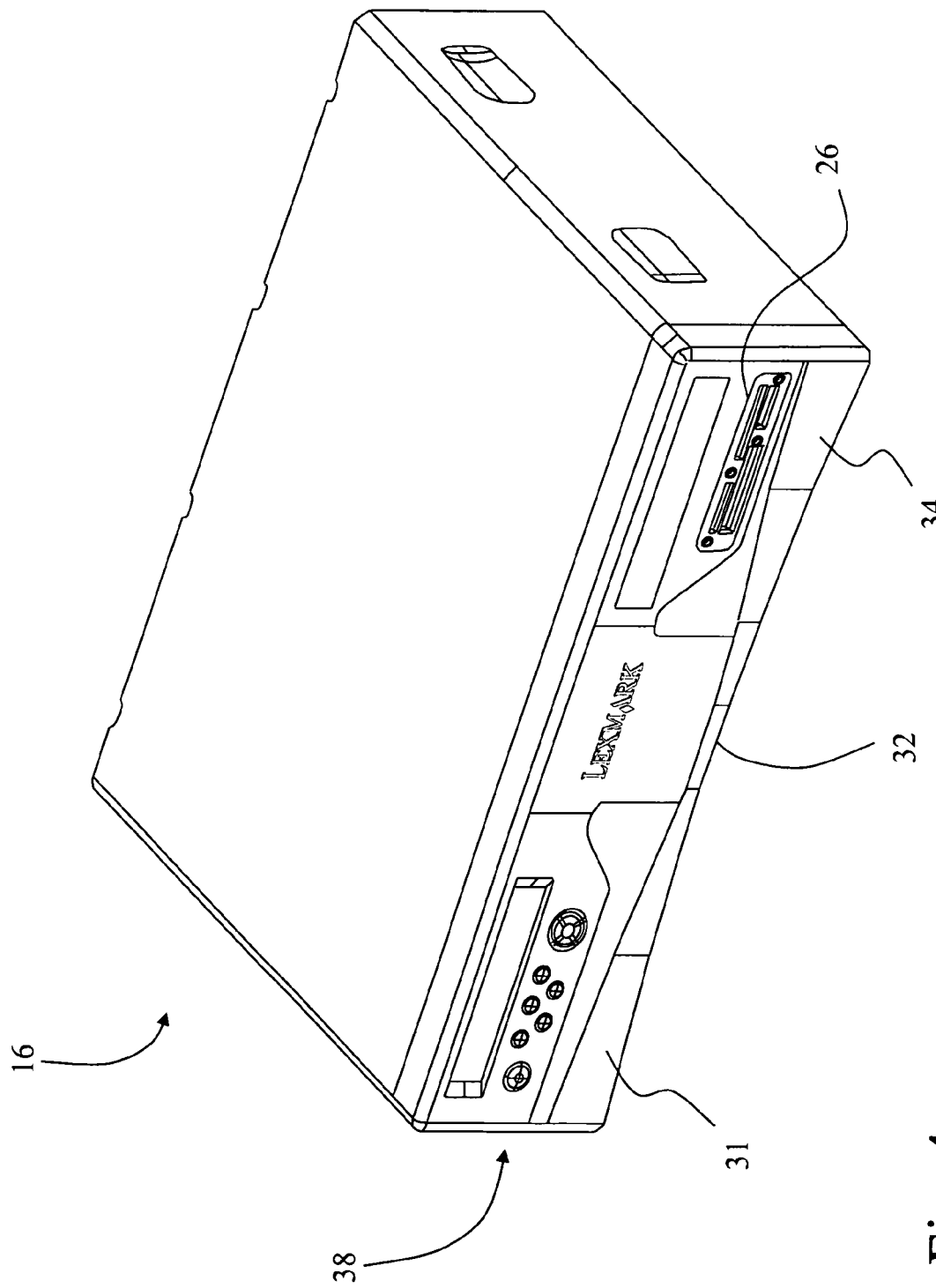
FIG. 4 is an external perspective view of the integrated home entertainment unit of FIG. 1 depicting the print media input and output trays and the print engine drawer in retracted positions.

Referring now to FIG. 4, once print media input tray 31 is filled with print media, the user may then push print media input tray 31 into its retracted position, from which it may supply print media to print engine 24.

Referring again to FIG. 3, in order to provide access to print engine 24, for example, to replace imaging cartridge 40, print engine drawer 32 is mounted in housing 36 and received in opening 98. Print engine drawer 32 mounts print engine 24, and is configured to extend and retract print engine 24 through opening 98. Print media output tray 34 is also mounted in housing 36 and received in opening 98. Print media output tray 34 is configured to receive from print engine 24 print medium 42 upon which image 96 has been printed while print media output tray 34 is in a retracted position, to extend through opening 98 to allow the user to retrieve print medium 42 having image 96 printed thereon, and to retract through opening 98 into the retracted position. Print media input tray 31 and print media output tray 34 are laterally adjacent to and disposed on either side of print engine 24.

During printing operations, a sheet of print medium 42 is supplied to print engine 24 from print media input tray 31, and once printing is complete, print medium 42 is placed into print media output tray 34.

Each of print media input tray 31 and print media output tray 34 are configured to independently extend and retract through opening 98. Thus, the user may extend print media input tray 31 in order to fill it with print media, without extending print engine drawer 32 and print engine 24, and without extending print media output tray 34. Similarly, once printing is completed, the user may extend print media output tray 34 in order to retrieve print medium 42 having image 96 printed thereon, without extending print engine drawer 32 and print engine 24, and without extending print media input tray 31.

However, print media input tray 31, print media output tray 34, and print engine drawer 32 are configured such that print media input tray 31 and print media output tray 34 extend through opening 98 under the action of print engine drawer 32 being extended through opening 98. Thus, in the event of a paper jam or other problem, the user merely has to extend print engine drawer 32, which catches and thereby extends print media input tray 31 and print media output tray 34, thus exposing the components of print engine 24, and permitting access to the interior of integrated home entertainment unit 16 via opening 98. This allows the user or a service technician to replace components of integrated home entertainment unit 16 or to clear any paper jam.

User interface 38 is mounted on housing 36, and includes a display, for example, an LCD display, as well as buttons for use in operating integrated home entertainment unit 16.

Figure 5A:
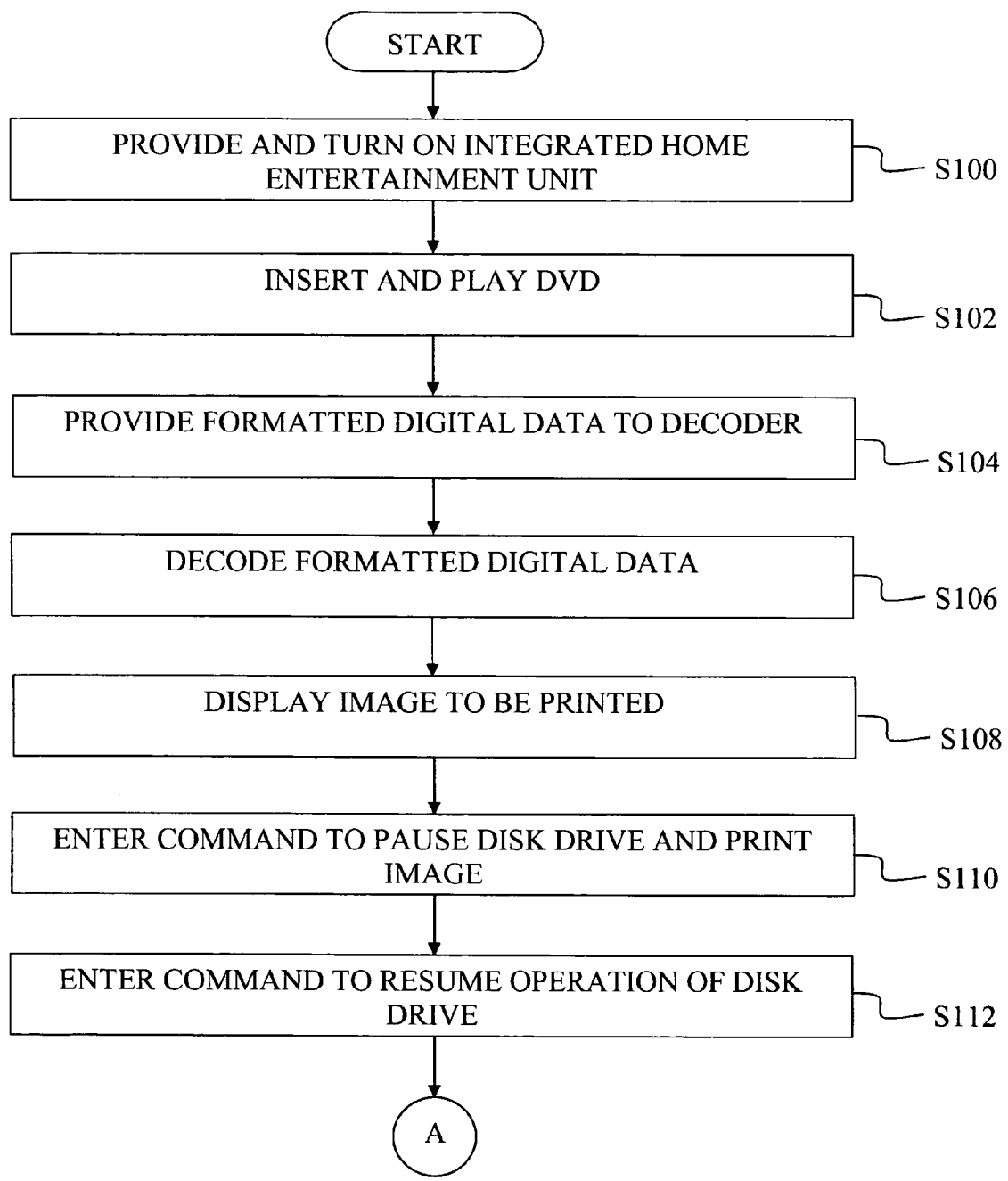
FIGS. 5A and 5B are a flowchart depicting a method of operating an integrated home entertainment unit in accordance with the present invention.
Figure 5B:
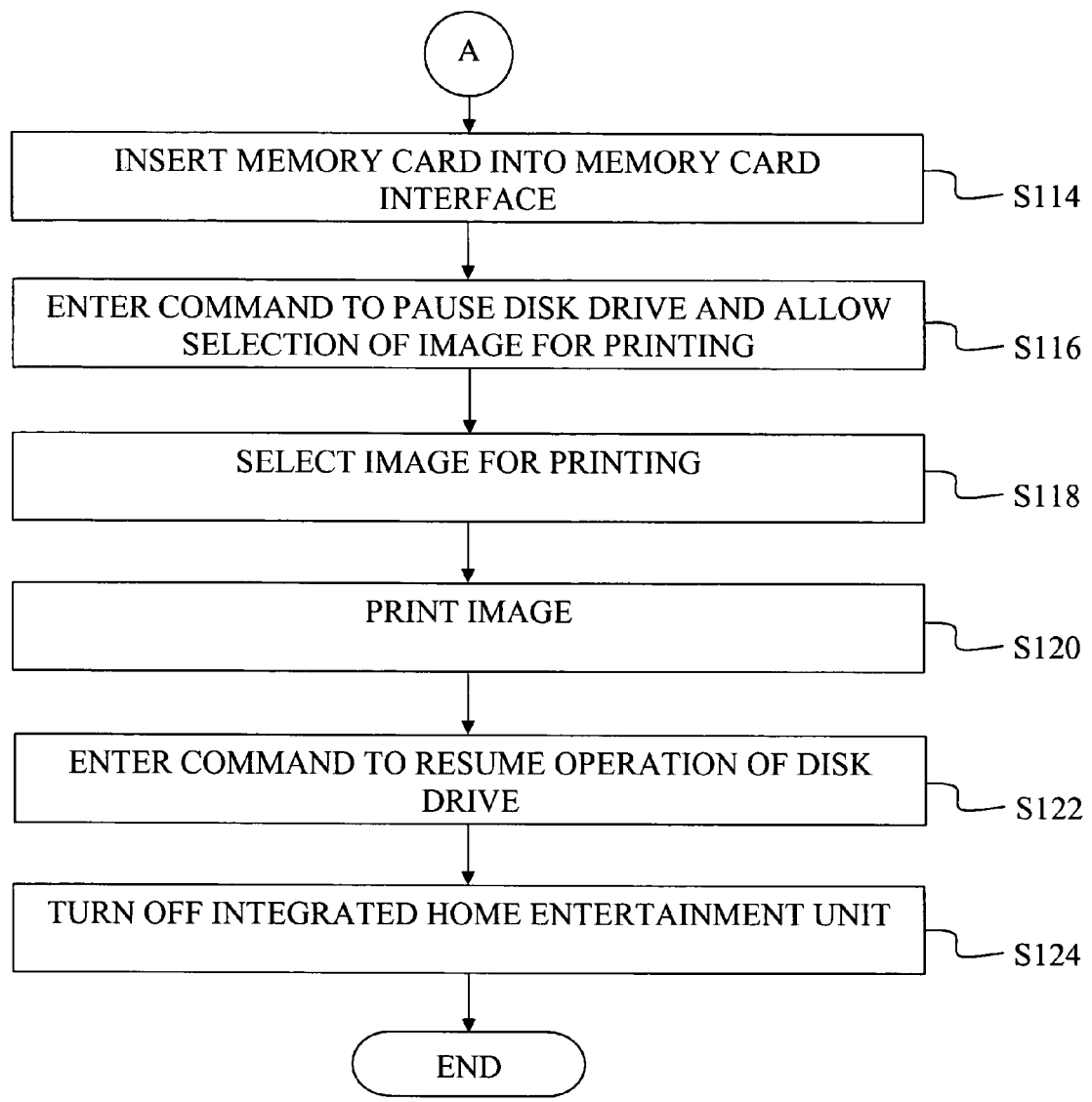

Referring now to FIGS. 5A and 5B, a method of operating integrated home entertainment unit 16 is described.

At step S100, integrated home entertainment unit 16 is provided to a user, and is powered up, i.e., turned on, for example, by the user pushing a "power" button on remote control 18 or user interface 38.

At step S102, the user inserts an optical disk, such as a DVD video disk having a home movie recorded thereon, into integrated home entertainment unit 16, and plays the DVD video disk optical disk drive 22, for example, by pressing a "play" button on remote control 18 or user interface 38.

At step S104, optical disk drive 22 provides video data in the form of formatted digital data to decoder 46.

At step S106, decoder 46 decodes the formatted digital data to produce output data suitable for human viewing, which is displayed on display monitor 14.

At step S108, integrated home entertainment unit 16 displays image 96 sought to be printed, for example, a video frame output by optical disk drive 22 and displayed on display monitor 14 that the user wishes to print.

At step S110, the user enters a single command, for example, by pushing a "pause-print" button on remote control 18 or user interface 38, which commands controller 28 to pause the operation of optical disk drive 22, and to cause print engine 24 to print image 96.

At step S112, the user desires to continue watching the DVD, and enters another single command, e.g., by pushing a "play" button on remote control 18 or user interface 38, or by making a selection from a user interface screen displayed on display 14, which commands controller 28 to resume operation of optical disk drive 22 playing the DVD disk, while driving print engine 24 to continue to print image 96 in the event that printing is not yet complete.

At step S114, the user desires to print image 96 in the form of a photo obtained by a digital device, for example, digital camera 12, and stored in memory card 20 associated with digital camera 12, and inserts memory card 20 into memory card interface 26 of integrated home entertainment unit 16. Memory card 20 stores image 96 in the form of digital card data. Alternatively, it is contemplated that the photo is stored in a memory of digital camera 12, in which case, the user attaches digital camera 12 to integrated home entertainment unit 16, for example, using USB port 68.

At step S116, the user enters a single command, for example, by pushing a "photo-print" button on remote control 18 or user interface 38, which commands controller 28 to pause the operation of optical disk drive 22, and to generate a user selection screen that allows the user to select image 96 for printing. For example, there can be many photos stored on memory card 20 or in digital camera 12, whereas the user may only desire to print a single photo as image 96.

At step S118, the user selects the photo as image 96 for printing.

At step S120, image 96 is printed by print engine 24, for example, in response to the user pushing a "print" button on remote control 18 or user interface 38, or in response to the user making a selection from a user interface screen displayed on display 14.

At step S122, if the user desires to continue watching the DVD, the user enters another single command, e.g., by pushing a "play" button on remote control 18 or user interface 38, or by making a selection from a user interface screen displayed on display 14, which commands controller 28 to resume operation of optical disk drive 22, while driving print engine 24 to continue to print image 96 in the event that printing is not yet complete.

At step S124, the user has finished using integrated home entertainment unit 16, and turns it off, for example, by pushing the "power" button on remote control 18 or user interface 38, or by making a selection from a user interface screen displayed on display 14.

Integrated home entertainment unit 16 may also be used for creating and presenting slide shows. For example, desired images would be copied to a CD or DVD disk from memory card 20, or otherwise stored on a CD or DVD disk, and slide-show software executing on controller 28 would display the images in a sequence desired by the user. Audio data may be added to the slide-show presentation using MP3 audio data obtained via memory card interface 26 and/or a microphone plugged into microphone input port 72. An on screen menu generated by processor 44 allows the user to move through photos or other images, save images, and delete images using remote control 18 or user interface 38. In addition, photo-editing software executing on controller 28 allows manipulation of photos, such as cropping, red-eye removal, and cutting and pasting. Further, integrated home entertainment unit 16 allows the sharing of photos across the various types of memory card 20. For example, images may be transferred from one type of memory card to another type of memory card, allowing the user to share photos with friends who may use different types of memory card 20.

As set forth above, integrated home entertainment unit 16 provides the user with the ability to view, share, print, and store photos generated by digital camera 12 or another digital device, as well as to play DVD video disks and CD audio disks. By combining the functions of optical disk drive 22, print engine 24, and controller 28, duplicity of components is avoided. For example, separate disk drives are not required in order to listen to or record a CD audio disk, to watch or record a DVD video disk, and to store photos on CD or DVD disks, since optical disk drive 22 allows each such activity to be performed using integrated home entertainment unit 16. In addition, separate controllers are not required for optical disk drive 22 and print engine 24, because controller 28 provides operational control for both of them. By avoiding the duplicity of components, the cost to the customer for the functionality of integrated home entertainment unit 16 may be lower than if the customer purchased separate home entertainment units that together provide the functionality of integrated home entertainment unit 16. Also, by avoiding a duplicity of components, physical space requirements of integrated home entertainment unit 16 can be reduced relative to an aggregation of separate units.

While this invention has been described with respect to exemplary embodiments, it will be recognized that the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An integrated home entertainment unit, comprising:
a print media source configured to hold a print medium;
a print engine coupled to said print media source;
an optical disk drive configured to output formatted digital data;
a controller having a processor and a decoder, said controller being communicatively coupled to said optical disk drive and to said print engine, said decoder configured to decode said formatted digital data to produce output data, and said processor executing instructions to control said print engine to print an image on said print medium supplied from said print media source using at least a part of said output data;
a housing having mounted therein said print media source, said print engine, said optical disk drive, and said controller;
an opening in said housing, the opening configured to receive a print media input tray and a print media output tray with the print media input tray and the print media output tray laterally adjacent to and disposed on either side of said print engine; and
a print engine drawer mounted in said housing and received in said opening, said print engine drawer mounting said print engine and being configured to extend and retract said print engine through said opening.

2. An integrated home entertainment unit, comprising:
a print media source configured to hold a print medium;
a print engine coupled to said print media source;
an optical disk drive configured to output formatted digital data;
a controller having a processor and a decoder, said controller being communicatively coupled to said optical disk drive and to said print engine, said decoder configured to decode said formatted digital data to produce output data, and said processor executing instructions to control said print engine to print an image on said print medium supplied from said print media source using at least a part of said output data;
a housing having mounted therein said print media source, said print engine, said optical disk drive, and said controller;
an opening in said housing, the opening configured to receive a print media input tray; and
a print media output tray mounted in said housing and received in said opening, said print media output tray configured:
to receive from said print engine said print medium upon which said image has been printed while in a retracted position;
to extend through said opening to allow a user to retrieve said print medium; and
to retract through said opening into said retracted position, wherein the print media input tray and the print media output tray are laterally adjacent to and disposed on either side of said print engine.

3. An integrated home entertainment unit, comprising:
a print media source configured to hold a print medium;
a print engine coupled to said print media source;
an optical disk drive configured to output formatted digital data;
a controller having a processor and a decoder, said controller being communicatively coupled to said optical disk drive and to said print engine, said decoder configured to decode said formatted digital data to produce output data, and said processor executing instructions to control said print engine to print an image on said print medium supplied from said print media source using at least a part of said output data;
a housing having mounted therein said print media source, said print engine, said optical disk drive, and said controller;
an opening in said housing for receiving said print media source, wherein said print media source is a print media input tray mounted in said housing and configured to extend and retract through said opening;
a print engine drawer mounted in said housing and received in said opening, said print engine drawer mounting said print engine and being configured to extend and retract said print engine through said opening; and
a print media output tray mounted in said housing and received in said opening, said print media output tray configured:
to receive from said print engine said print medium upon which said image has been printed while in a retracted position;
to extend through said opening to allow a user to retrieve said print medium; and
to retract through said opening into said retracted position, wherein said print media input tray and said print media output tray are laterally adjacent to and disposed on either side of said print engine.

4. The integrated home entertainment unit of claim 3, wherein each of said print media input tray and said print media output tray are configured to independently extend and retract through said opening.

5. The integrated home entertainment unit of claim 4, wherein said print media input tray, said print media output tray, and said print engine drawer are configured such that said print media input tray and said print media output tray are engaged by said print engine drawer to extend through said opening under an action of said print engine drawer being extended through said opening.

* * * * *